July 6, 1926.

E. D. STINSON

SUN VISOR FOR AUTOMOBILES

Filed Jan. 28, 1926

1,591,573

Inventor

Ethel D. Stinson.

By Adam E. Fisher.

Attorney

Patented July 6, 1926.

1,591,573

UNITED STATES PATENT OFFICE.

ETHEL D. STINSON, OF BISBEE, ARIZONA.

SUN VISOR FOR AUTOMOBILES.

Application filed January 28, 1926. Serial No. 84,285.

This invention is a sun visor for automobiles, and the object is to provide a simple, practical and adjustable device of the kind which may be readily mounted in place and which is equipped with means for releasably locking the visor in any adjusted position.

In the drawing—

Figure 1:
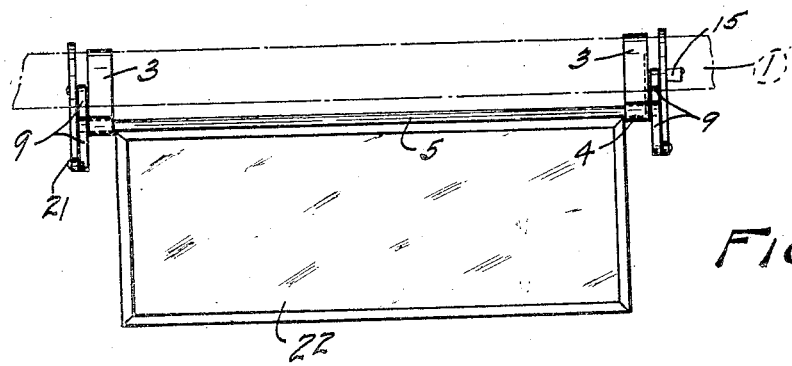
Figure 1 is a front elevation.
Figure 2:
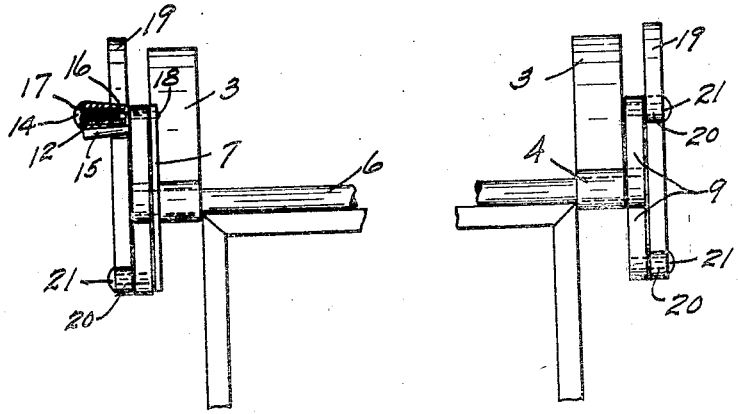
Figure 2 is a rear elevation.
Figure 3:
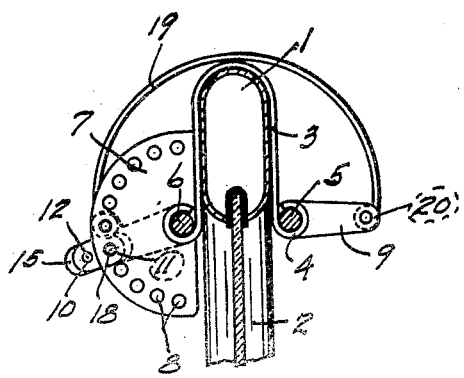
Figure 3 is a vertical section through a windshield of an automobile equipped with this improvement.

In combination with the upper cross bar 1 of an automobile windshield 2, the invention comprises a couple of U-shaped hangers 3, which are inverted in place over the top of the said bar 1. The lower ends of the hangers 3 are rolled over outwardly to form bearing rings 4 for the ends of an outer visor rod 5 and an inner operating rod 6, which rods are journaled in place in the said rings. From left hand bearing ring of the said inner operating rod, an adjustment plate 7 is rigidly extended perpendicularly to the said ring, and this plate is pierced with a plurality of adjustment holes 8 arranged concentrically with the axis of the said operating rod 6. Operating cranks 9 are rigidly connected at the ends of the rods 5 and 6, the said cranks being directed outwardly from their respective rods. The crank adjacent to the said plate 7 is provided with an extension in the nature of a lug 10 which is pierced with a transverse bore 11 aligned with the holes 8. Immediately adjacent the bore 11 a tension pin 12 is set rigidly in the lug 10 and extends outwardly perpendicularly to the said crank. A latch lug 15 is provided, having a bore 16 adapted to slidingly engage the pin 12, the outer part of the bore 16 being enlarged so as to receive the coil spring 17 which is set over the pin 12 and held in place by its head 14. A latch pin 18 rigidly extends from the lug 15 adjacent the bore 16, the pin being accurately spaced from the said bore 16 so as to slidingly engage the said bore 11 and being long enough to pass through the bore 11 and into any one of the holes 8 of the plate 7. It will be seen that the action of the spring 17 is to normally throw the lug 15 inwardly with the pin 18 in engagement with one of the said holes 8. However, by pulling outwardly upon the lug 15, the pin 18 may be withdrawn for lodgment in another hole. Arcuate arms 19 are provided, their ends being coiled to form eyes 20. These arms are extended over the bar 1 and set screws 21 are then passed through the eyes 20 and into the ends of the cranks 9. A visor 22 of any conventional form is rigidly mounted edgewise to the outer visor rod 5. The visor 22 may be readily raised or lowered as may be desired by pulling out the pin 18 and moving the lug 10 upwardly or downwardly, this action being transmitted to the cranks of the visor rod 5 through the arms 19.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with the upper cross bar of the wind-shield frame of an automobile, an adjustable mounting for a sun visor, the same comprising U-shaped hangers inverted over the cross bar, the ends of the hangers being rolled to form bearing rings; an outer visor rod and an inner operating rod journaled in the said bearing rings of the said hangers; operating cranks rigidly attached to the ends of the visor and operating rods; and arcuate arms extended over the said cross bar and connected by their ends to the said operating cranks.

2. In combination with the upper cross bar of the wind-shield frame of an automobile, an adjustable mounting for a sun visor, the same comprising U-shaped hangers inverted over the cross bar, the ends of the hangers being rolled to form bearing rings; an outer visor rod and an inner operating rod journaled in the said bearing rings of the said hangers; operating cranks rigidly attached to the ends of the visor and operating rods; arcuate arms extended over the said cross bar and connected by their ends to the said operating cranks; and means for releasably locking the said operating cranks in any set position.

3. In combination with the upper cross bar of the wind-shield frame of an automobile, an adjustable mounting for a sun visor, the same comprising U-shaped hangers inverted over the cross bar, the ends of the hangers being rolled to form bearing rings; an outer visor rod and an inner operating rod journaled in the said bearing rings of the said hangers; operating cranks rigidly attached to the ends of the visor and operating rods; arcuate arms extended over the said cross bar and connected by their ends to the said operating cranks; means for releasably locking the said operating cranks in any set position; said means including an adjustment plate extended from one of the bearing rings of the said operating rod, the said plate being pierced with a plurality of holes concentric with the axis of the rod and a latch mounted upon the adjacent operating crank and adapted to releasably engage any one of the said holes of the said adjustment plate.

In testimony whereof I affix my signature.

(Mr.) ETHEL D. STINSON.